United States Patent
Ham et al.

(10) Patent No.: US 12,304,566 B2
(45) Date of Patent: May 20, 2025

(54) VEHICLE BODY STRUCTURE

(71) Applicants: Hyundai Motor Company, Seoul (KR); Kia Corporation, Seoul (KR)

(72) Inventors: Seong Hoon Ham, Seoul (KR); Keon Woo Kim, Hwaseong-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 279 days.

(21) Appl. No.: 17/939,244

(22) Filed: Sep. 7, 2022

(65) Prior Publication Data

US 2023/0303175 A1 Sep. 28, 2023

(30) Foreign Application Priority Data

Mar. 25, 2022 (KR) .................. 10-2022-0037594

(51) Int. Cl.
| | |
|---|---|
| *B62D 25/04* | (2006.01) |
| *B62D 21/15* | (2006.01) |
| *B62D 25/06* | (2006.01) |
| *B62D 27/02* | (2006.01) |

(52) U.S. Cl.
CPC ............ *B62D 25/04* (2013.01); *B62D 21/15* (2013.01); *B62D 25/06* (2013.01); *B62D 27/023* (2013.01)

(58) Field of Classification Search
CPC ...... B62D 25/04; B62D 25/06; B62D 27/023; B62D 27/065; B62D 27/06; B62D 21/15
USPC ............... 296/193.06, 203.01–4, 210, 29, 30
See application file for complete search history.

(56) References Cited

U.S. PATENT DOCUMENTS

| | | | | |
|---|---|---|---|---|
| 7,900,997 | B2* | 3/2011 | Hosaka .................. | B62D 25/07 296/193.12 |
| 9,731,770 | B2* | 8/2017 | Chung .................. | B62D 29/008 |
| 11,173,961 | B2* | 11/2021 | Kiyoshita .............. | B62D 21/08 |
| 2017/0036703 | A1* | 2/2017 | Maeda .................... | B62D 25/04 |

FOREIGN PATENT DOCUMENTS

JP 2004082861 A * 3/2004

OTHER PUBLICATIONS

JP2004082861 Text (Year: 2004).*

* cited by examiner

*Primary Examiner* — Dennis H Pedder
(74) *Attorney, Agent, or Firm* — Slater Matsil, LLP

(57) ABSTRACT

An embodiment vehicle body includes a roof side rail, a front pillar connected to a front portion of the roof side rail, and a roof side reinforcement extending along the roof side rail and the front pillar, wherein the roof side reinforcement is fixedly received in a cavity of the roof side rail and a cavity of the front pillar.

14 Claims, 16 Drawing Sheets

VEHICLE BODY STRUCTURE

CROSS-REFERENCE TO RELATED APPLICATIONS

This application claims the benefit of Korean Patent Application No. 10-2022-0037594, filed on Mar. 25, 2022, which application is hereby incorporated herein by reference.

TECHNICAL FIELD

The present disclosure relates to a vehicle body structure.

BACKGROUND

A vehicle includes a roof structure covering the top of a passenger compartment. The roof structure includes a pair of roof side rails spaced apart from each other in a width direction of the vehicle, a plurality of roof crossmembers connecting the pair of roof side rails, and a roof panel supported by the pair of roof side rails and the plurality of roof crossmembers.

In the event of a frontal collision, a vehicle front structure may be deformed before an impact load is transferred to occupants, thereby appropriately absorbing impact energy. However, in the event of a vehicle rollover accident, the impact energy may push the roof panel and be directly transferred to the passenger compartment, thereby causing fatal injury to the occupants. In order to safely protect the occupants from the vehicle rollover accident, it is necessary to ensure sufficient roof strength of the vehicle.

Meanwhile, as a vehicle body structure according to the related art has a closed cross section, an upper front end portion of a rear pillar may be connected to a rear portion of a roof side rail using an adhesive or the upper front end portion of the rear pillar and the rear portion of the roof side rail may be spaced apart from each other.

A joint portion between the rear portion of the roof side rail and the upper front end portion of the rear pillar may be relatively vulnerable. Accordingly, when the vehicle is driving, noise may be generated between the rear portion of the roof side rail and the upper front end portion of the rear pillar. Connection stiffness between the roof side rail and the rear pillar may be insufficient, resulting in a reduction in stiffness and durability of the vehicle body structure.

In a center pillarless vehicle, from which a center pillar (called a "B-pillar") is removed, stress may concentrate on the joint portion between the rear portion of the roof side rail and the upper front end portion of the rear pillar. As a result, the joint portion between the rear portion of the roof side rail and the upper front end portion of the rear pillar may be likely to be easily damaged.

The above information described in this background section is provided to assist in understanding the background of the inventive concept, and may include any technical concept which is not considered as the prior art that is already known to those skilled in the art.

SUMMARY

The present disclosure relates to a vehicle body structure. Particular embodiments relate to a vehicle body structure improving roof strength.

Embodiments of the present disclosure can solve problems occurring in the prior art while advantages achieved by the prior art are maintained intact.

An embodiment of the present disclosure provides a vehicle body structure improving roof strength of a vehicle body and increasing connection stiffness between a roof side rail and a rear pillar.

According to an embodiment of the present disclosure, a vehicle body structure may include a roof side rail, a front pillar connected to a front portion of the roof side rail, and a roof side reinforcement extending along the roof side rail and the front pillar. The roof side reinforcement may be fixedly received in a cavity of the roof side rail and a cavity of the front pillar.

As the roof side reinforcement is fixedly received in the cavity of the roof side rail and the cavity of the front pillar, the roof side reinforcement may improve connection stiffness between the roof side rail and the front pillar and smoothly transfer a load applied to a roof structure of the vehicle to the front pillar, thereby improving roof strength.

The roof side rail may include a roof side inboard panel facing the interior of the vehicle and a roof side outboard panel facing the exterior of the vehicle. The roof side reinforcement may be fixed to at least one of the roof side inboard panel and the roof side outboard panel.

The roof side inboard panel may have an inner recessed portion which is recessed toward the roof side reinforcement, and the inner recessed portion may be fixed to the roof side reinforcement.

The roof side outboard panel may have an outer recessed portion which is recessed toward the roof side reinforcement, and the outer recessed portion may be fixed to the roof side reinforcement.

The front pillar may include a front pillar upper connected to the front portion of the roof side rail and a front pillar lower connected to the front pillar upper. The front pillar upper may include a front pillar inboard panel facing the interior of the vehicle and a front pillar outboard panel facing the exterior of the vehicle.

The front pillar inboard panel may have an inner recessed portion which is recessed toward the roof side reinforcement, and the inner recessed portion may be fixed to the roof side reinforcement.

The front pillar outboard panel may have an outer recessed portion which is recessed toward the roof side reinforcement, and the outer recessed portion may be fixed to the roof side reinforcement.

According to another embodiment of the present disclosure, a vehicle body structure may include a roof side rail and a rear pillar having an upper front portion connected to a rear portion of the roof side rail. The rear portion of the roof side rail may at least partially overlap and be fixed to the upper front portion of the rear pillar.

As the rear portion of the roof side rail at least partially overlaps and is fixed to the upper front portion of the rear pillar, connection stiffness between the rear portion of the roof side rail and the upper front portion of the rear pillar may be further improved.

The vehicle body structure may further include a roof side reinforcement extending along the roof side rail and the upper front portion of the rear pillar.

The roof side reinforcement may extend along the roof side rail and the upper front portion of the rear pillar, thereby improving stiffness of the roof side rail and stiffness of the upper front portion of the rear pillar.

A rear portion of the roof side reinforcement may at least partially overlap and be fixed to the rear portion of the roof side rail and/or the upper front portion of the rear pillar.

Accordingly, connection stiffness between the rear portion of the roof side rail and the upper front portion of the rear pillar may be further improved.

The upper front portion of the rear pillar may include a first fastening point configured to fasten the roof side rail and a rear portion of the roof side reinforcement through a fastener.

The roof side rail may include a roof side inboard panel facing the interior of the vehicle. The first fastening point may be located in an overlapped portion of the upper front portion of the rear pillar, a rear portion of the roof side inboard panel, and the rear portion of the roof side reinforcement.

The rear pillar may include a rear pillar inner facing the interior of the vehicle and an upper front reinforcement attached to an upper front portion of the rear pillar inner. The upper front portion of the rear pillar may include a second fastening point configured to fasten a rear portion of the roof side reinforcement and the upper front reinforcement through a fastener.

The roof side rail may include a roof side outboard panel facing the exterior of the vehicle. The rear pillar may include a rear pillar inner facing the interior of the vehicle and an upper front reinforcement attached to an upper front portion of the rear pillar inner. The upper front portion of the rear pillar may include a third fastening point configured to fasten the upper front reinforcement and a rear extension portion of the roof side outboard panel through a fastener.

The roof side rail may include a roof side outboard panel facing the exterior of the vehicle. The rear pillar may include a rear pillar inner facing the interior of the vehicle, an upper front reinforcement attached to an upper front portion of the rear pillar inner, and a front reinforcement attached to a front portion of the rear pillar inner.

An upper portion of the front reinforcement may overlap the upper front reinforcement, and the upper front portion of the rear pillar may include a fourth fastening point configured to fasten the upper front reinforcement, the front reinforcement, and a rear extension portion of the roof side outboard panel through a fastener.

The upper front portion of the rear pillar may include a base, a front connection extending from the base toward the roof side rail, a rear connection extending from the base toward the rear of the vehicle, and a lower connection extending from the base toward the bottom of the vehicle.

The upper front portion of the rear pillar may be configured to extend in three different directions so that a load applied to the upper front portion of the rear pillar may be distributed and transferred in three different directions through the front connection, the rear connection, and the lower connection. By minimizing deformation of the vehicle body during a vehicle collision/impact, occupants may be protected more safely.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
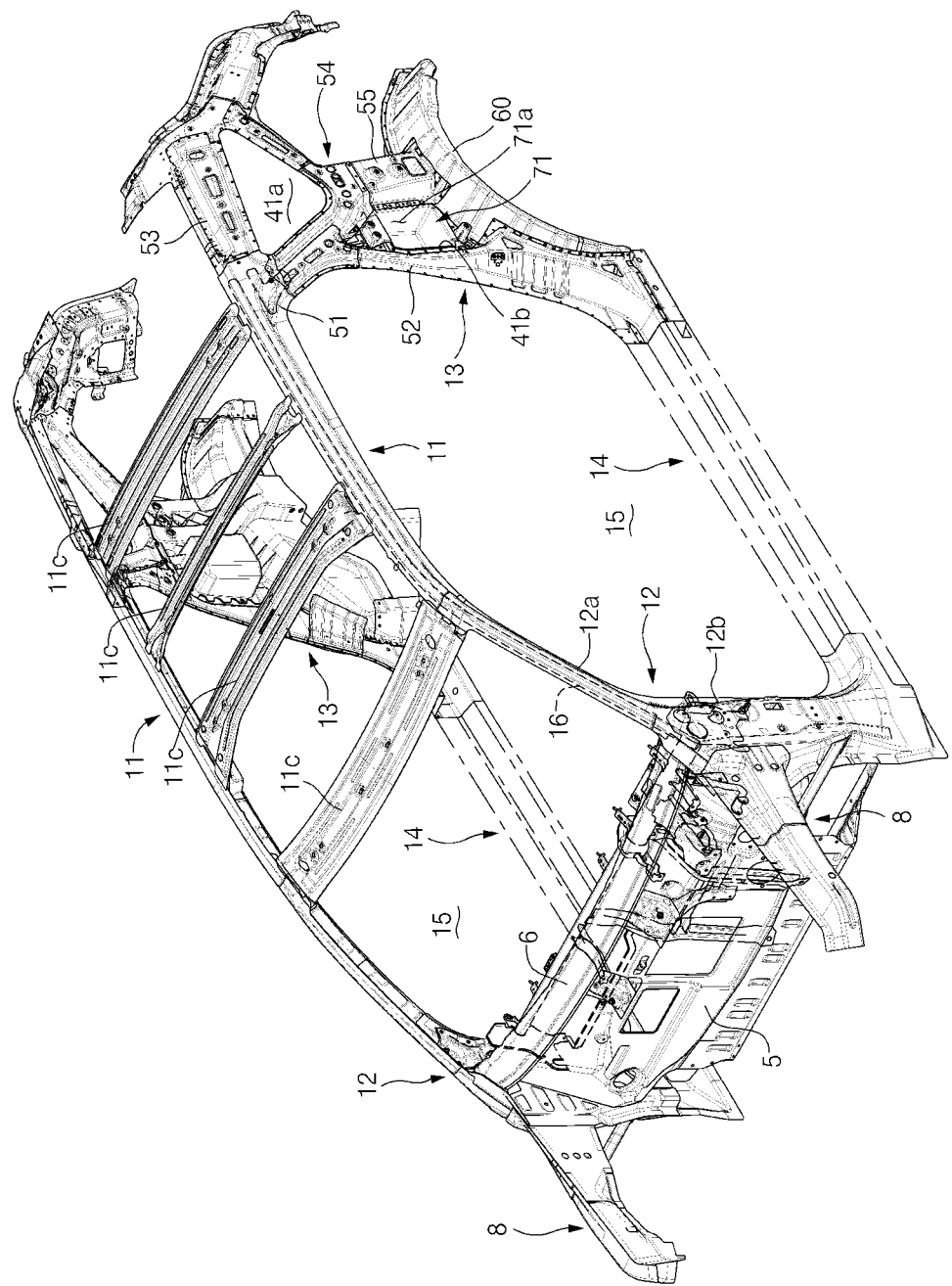
FIG. 1 illustrates a perspective view of a vehicle body structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of embodiments of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
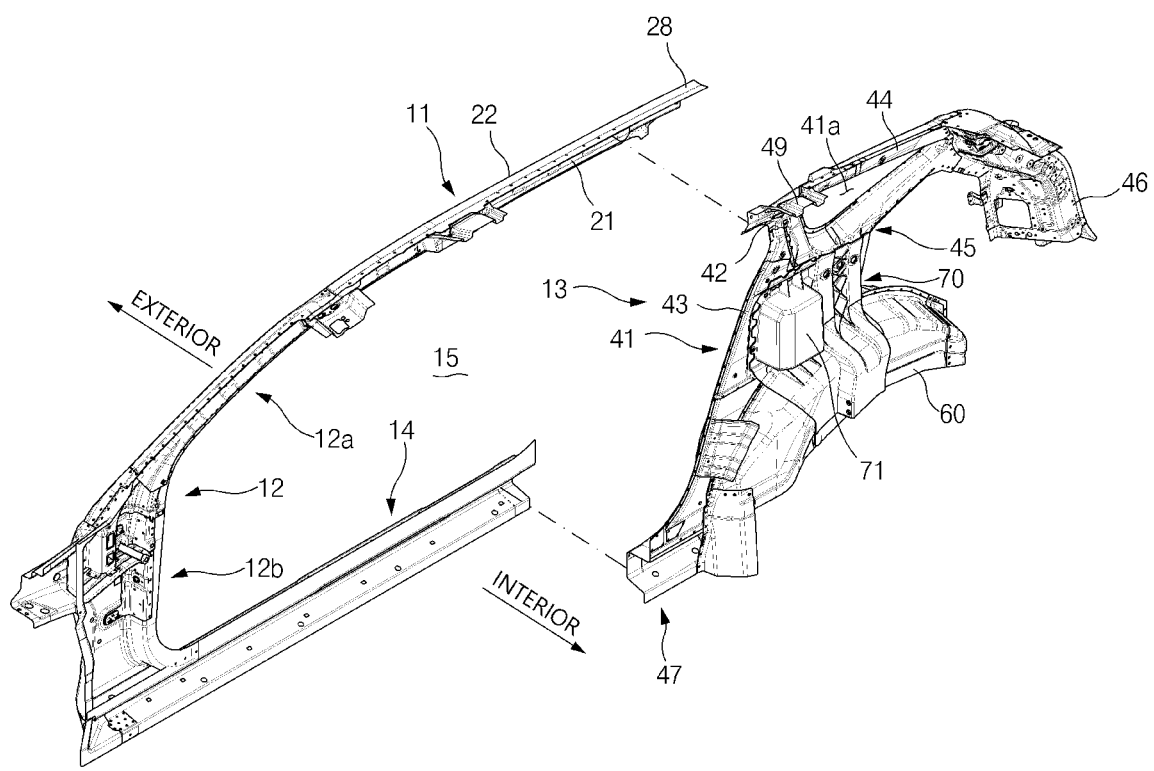
FIG. 2 illustrates a right front pillar, a right roof side rail, and a right rear pillar in a vehicle body structure according to an exemplary embodiment of the present disclosure.

Referring to FIGS. 1 and 2, a vehicle body structure according to an exemplary embodiment of the present disclosure may include a roof side rail 11, a front pillar 12 connected to the front of the roof side rail 11, a rear pillar 13 connected to the rear of the roof side rail 11, and a side sill 14 connecting a lower portion of the front pillar 12 and a lower portion of the rear pillar 13. The roof side rail 11, the front pillar 12, the rear pillar 13, and the side sill 14 may define a door opening 15, and a front side door, a rear side door, and the like may cover or uncover the door opening 15.

Referring to FIG. 1, the pair of roof side rails 11 may be spaced apart from each other in a width direction of the vehicle, and a plurality of roof crossmembers 11c may connect the pair of roof side rails 11. The pair of roof side rails 11 and the plurality of roof crossmembers 11c may support a roof panel. Referring to FIG. 2, each roof side rail 11 may include a front portion connected to a front pillar upper 12a of the front pillar 12 and a rear portion connected to the rear pillar 13.

Referring to FIG. 1, the pair of front pillars 12 may be connected to the pair of roof side rails 11, respectively. Referring to FIG. 2, each front pillar 12 may include the front pillar upper 12a connected to the front portion of the corresponding roof side rail 11 and a front pillar lower 12b connected to a front portion of the corresponding side sill 14. A top end of the front pillar lower 12b may be fixed to a bottom end of the front pillar upper 12a so that the front pillar lower 12b may be connected to the front pillar upper 12a.

Referring to FIG. 1, a pair of fender apron members 8 may be connected to the pair of front pillars 12, respectively. Each fender apron member 8 may extend in a longitudinal direction of the vehicle, and the fender apron member 8 may extend from the corresponding front pillar 12 toward the front of the vehicle.

Referring to FIG. 1, the pair of rear pillars 13 may be spaced apart from each other in the width direction of the vehicle, and the pair of rear pillars 13 may be connected to the corresponding roof side rails 11, respectively. Referring to FIG. 2, each rear pillar 13 may include an upper front portion connected to the rear portion of the corresponding roof side rail 11 and a lower front portion connected to a rear portion of the corresponding side sill 14. The upper front portion of the rear pillar 13 may be fixed to the rear portion of the corresponding roof side rail 11 using fasteners, welding, and/or the like, and the lower front portion of the rear pillar 13 may be fixed to the rear portion of the corresponding side sill 14 using fasteners, welding, and/or the like.

Referring to FIG. 1, the pair of side sills 14 may be spaced apart from each other in the width direction of the vehicle, and each side sill 14 may be connected to the lower portion of the corresponding front pillar 12.

Referring to FIG. 1, the vehicle body structure according to an exemplary embodiment of the present disclosure may include a dash panel 5 and a cowl member 6 disposed between the pair of front pillars 12. The dash panel 5 may be configured to divide a front compartment from a passenger compartment of the vehicle. The front compartment may be located in front of the dash panel 5, and a powertrain, transmission, and the like may be disposed in the front compartment. The passenger compartment may be located behind the dash panel 5, and vehicle seats, various convenience apparatuses, and the like may be disposed in the passenger compartment. The cowl member 6 may be disposed on a top edge of the dash panel 5, and the cowl member 6 may extend along the top edge of the dash panel 5 in the width direction of the vehicle. The cowl member 6 may cover a gap between a front windshield and a hood. Each end portion of the cowl member 6 may be fixed to the corresponding front pillar 12 using fasteners, welding, and/ or the like. That is, the cowl member 6 may connect the pair of front pillars 12 in the width direction of the vehicle.

Figure 3:
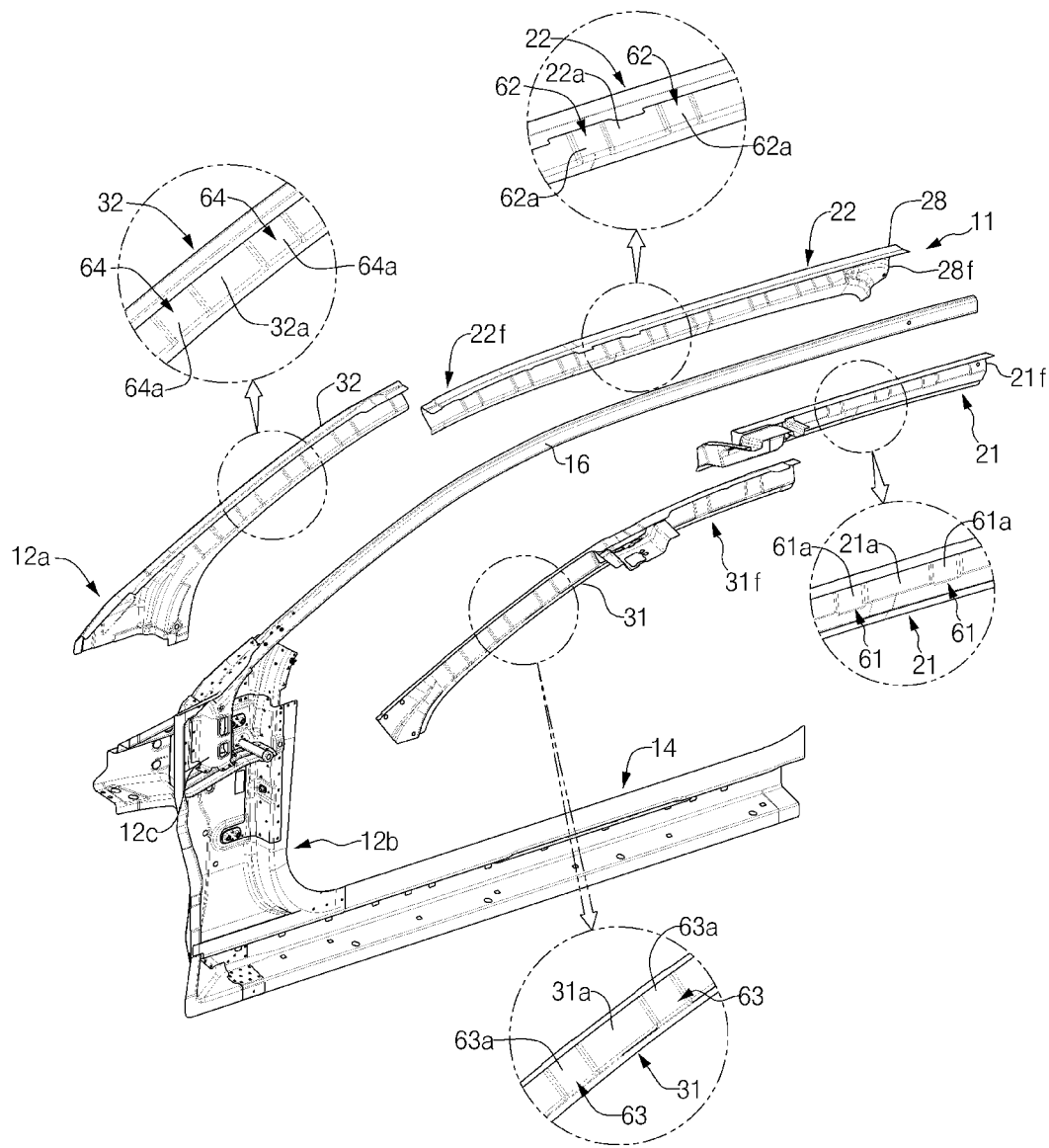
FIG. 3 illustrates a roof side reinforcement, a roof side rail, and a front pillar in a vehicle body structure according to an exemplary embodiment of the present disclosure.
Figure 4:
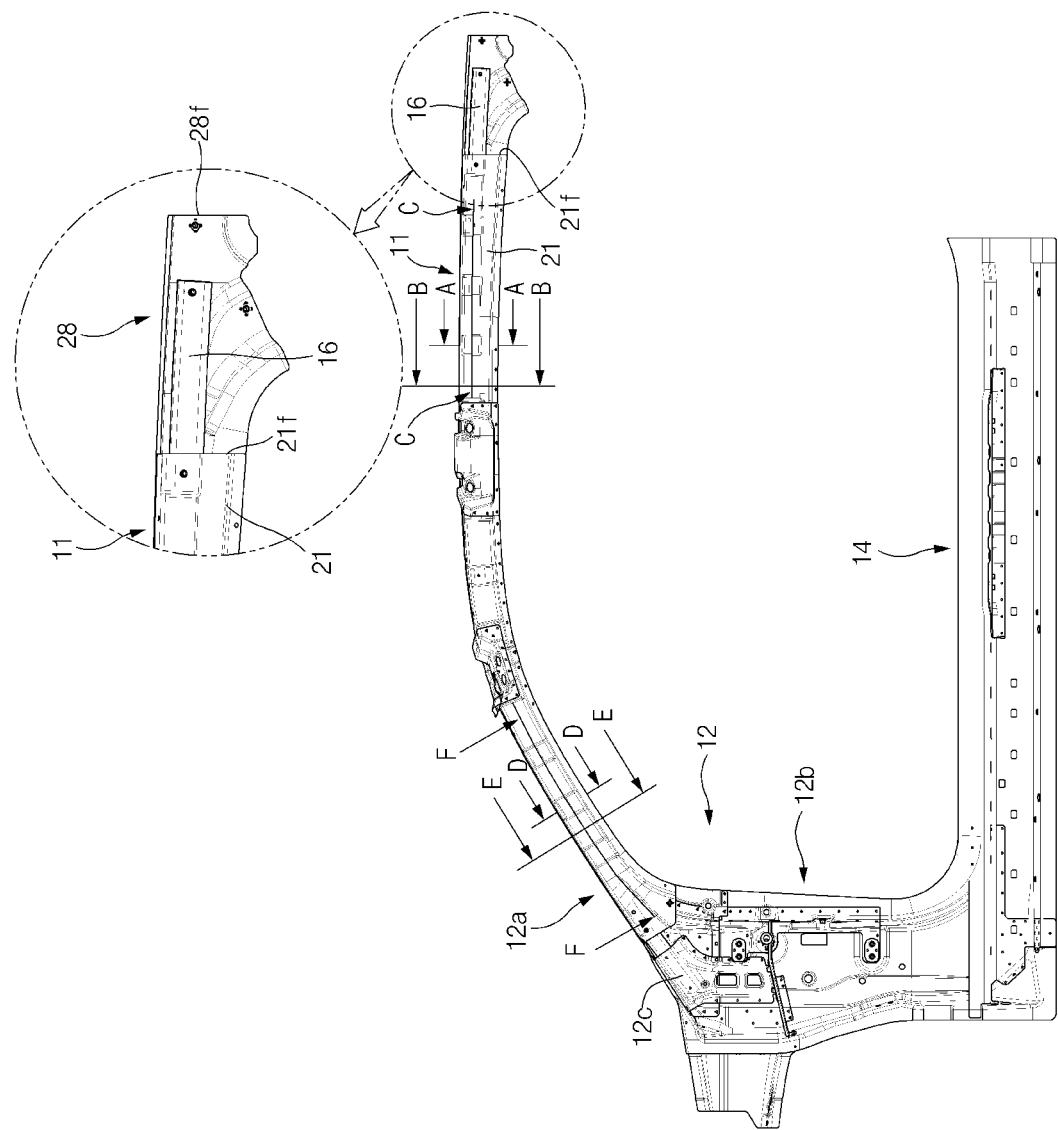
FIG. 4 illustrates a right front pillar, a right roof side rail, and a right side sill in a vehicle body structure according to an exemplary embodiment of the present disclosure.

Referring to FIGS. 3 and 4, the vehicle body structure according to an exemplary embodiment of the present disclosure may include a roof side reinforcement 16 extending from each roof side rail 11 toward the corresponding front pillar upper 12a and the corresponding rear pillar 13.

Referring to FIGS. 5, 6, 8, and 9, the roof side reinforcement 16 may include an inboard wall 16a facing the interior of the vehicle, an outboard wall 16b facing the exterior of the vehicle, a top wall 16c facing the top of the vehicle, and a bottom wall 16d facing the bottom of the vehicle. The roof side reinforcement 16 may have a tube shape including a cavity 16f defined by the inboard wall 16a, the outboard wall 16b, the top wall 16c, and the bottom wall 16d. For example, the roof side reinforcement 16 may be made of 150K class ultra high tensile steel. In particular, the roof side reinforcement 16 may be manufactured by 3D roll forming.

The inboard wall 16a and the outboard wall 16b may be flat, and the top wall 16c and the bottom wall 16d may be curved. In particular, the radius of curvature of the top wall 16c may be greater than that of the bottom wall 16d. Since an area of the top wall 16c is larger than that of the bottom wall 16d, strength of the top portion of the roof side reinforcement 16 may increase. In the event of a vehicle rollover accident, the roof side reinforcement 16 may sufficiently bear an impact load.

Figure 5:
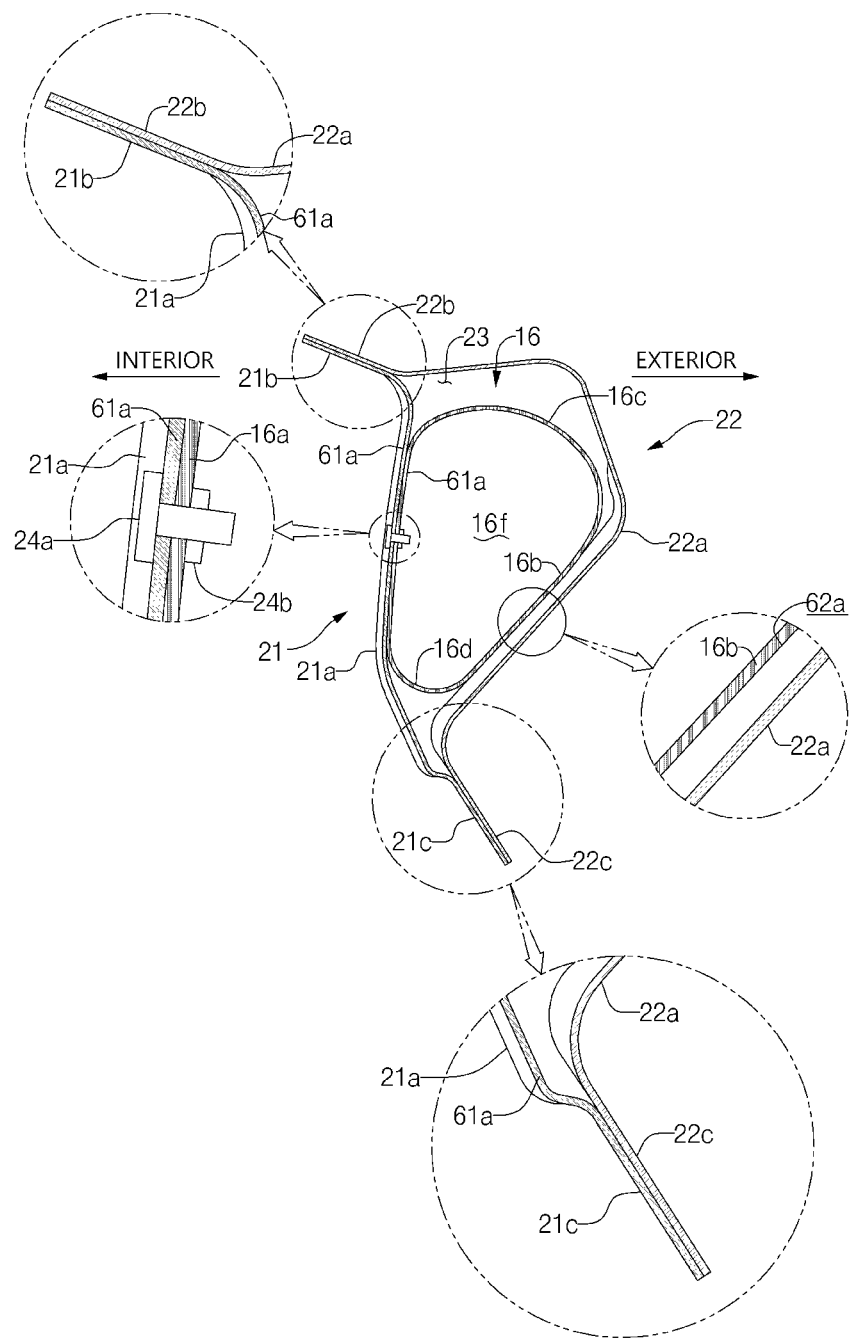
FIG. 5 illustrates a cross-sectional view, taken along line A-A of FIG. 4.
Figure 6:
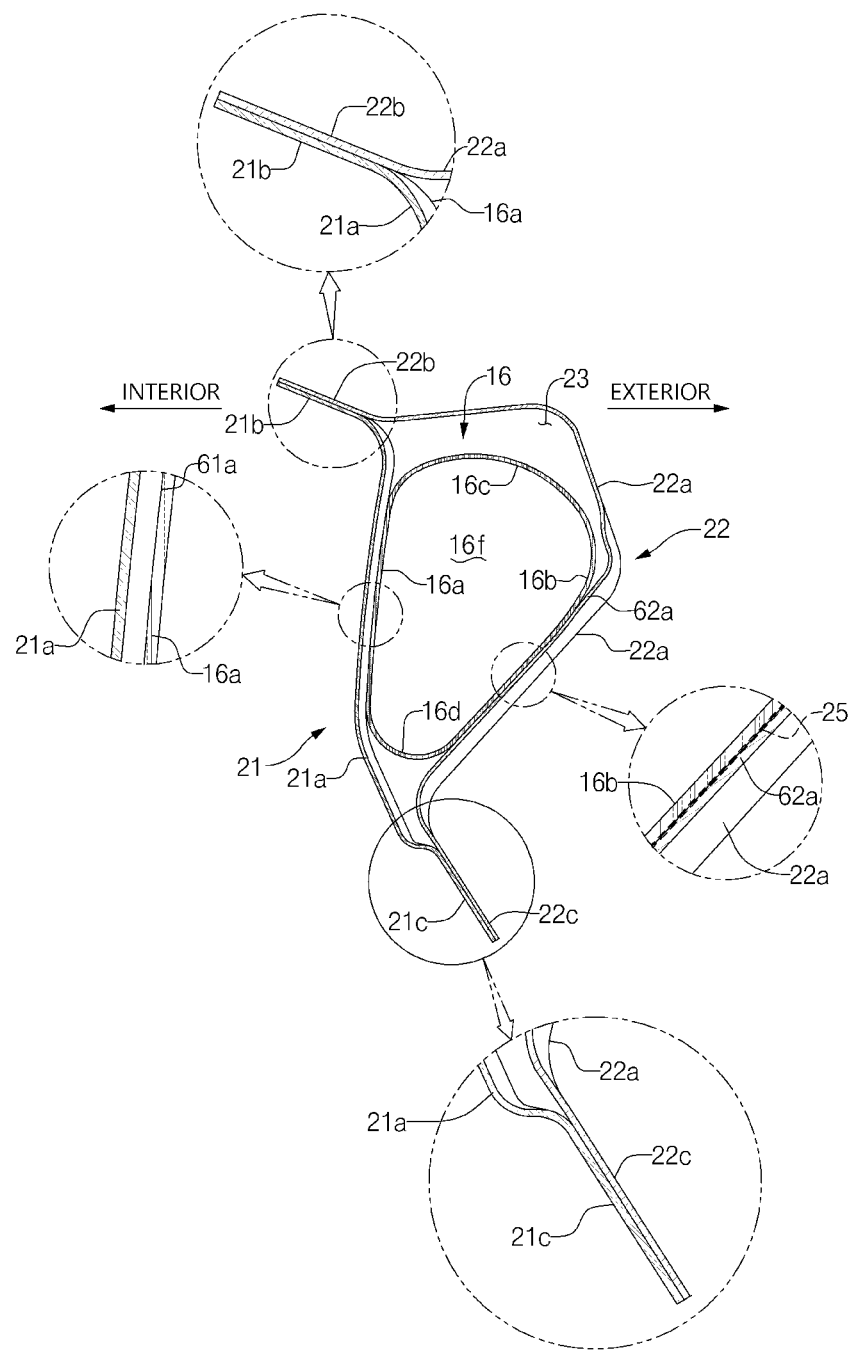
FIG. 6 illustrates a cross-sectional view, taken along line B-B of FIG. 4.

Referring to FIG. 3, the roof side rail 11 may include a roof side inboard panel 21 facing the interior of the vehicle and a roof side outboard panel 22 facing the exterior of the vehicle. Referring to FIGS. 5 and 6, the roof side inboard panel 21 may include an inboard wall 21a facing the interior of the vehicle, a top flange 21b provided on a top end of the inboard wall 21a, and a bottom flange 21c provided on a bottom end of the inboard wall 21a. The roof side outboard panel 22 may include an outboard wall 22a facing the exterior of the vehicle, a top flange 22b provided on a top end of the outboard wall 22a, and a bottom flange 22c provided on a bottom end of the outboard wall 22a. The top flange 21b of the roof side inboard panel 21 may be fixed to the top flange 22b of the roof side outboard panel 22 using fasteners, welding, and/or the like. The bottom flange 21c of the roof side inboard panel 21 may be fixed to the bottom flange 22c of the roof side outboard panel 22 using fasteners, welding, and/or the like. The roof side rail 11 may have a cavity 23 defined by the roof side inboard panel 21 and the roof side outboard panel 22, and the roof side reinforcement 16 may be received in the cavity 23 of the roof side rail 11.

Figure 7:
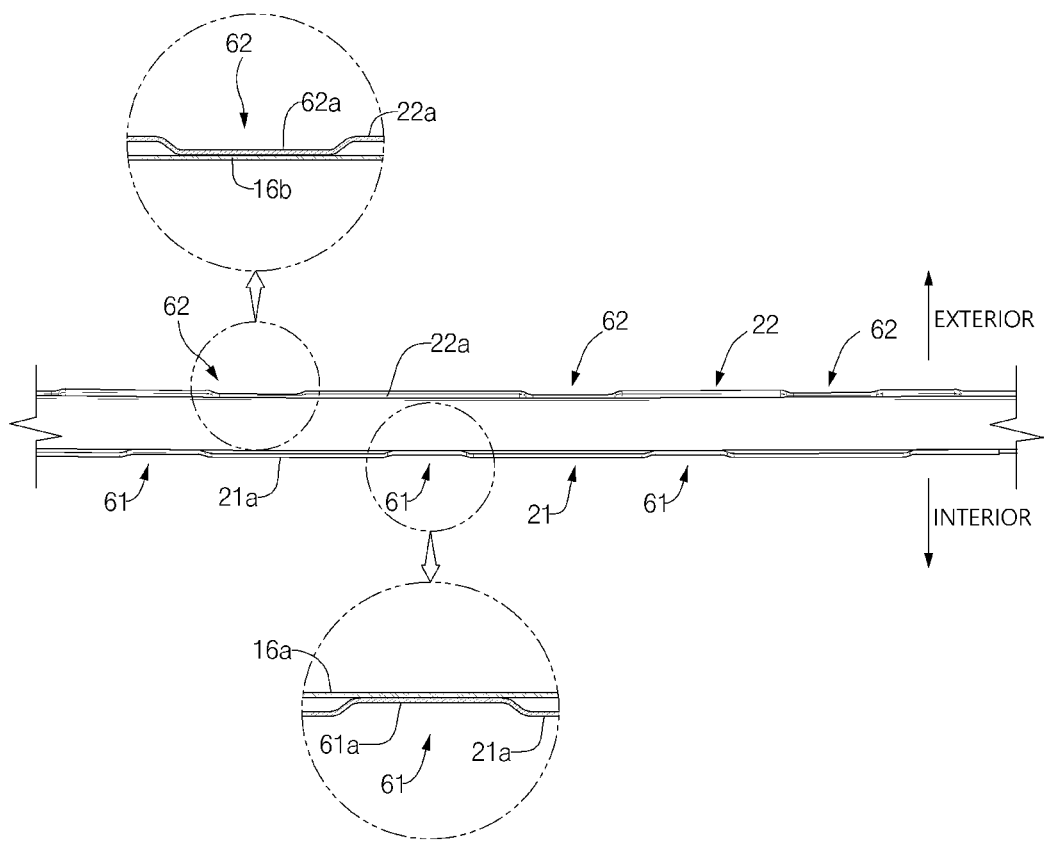
FIG. 7 illustrates a cross-sectional view, taken along line C-C of FIG. 4.

The roof side reinforcement 16 may be fixed to at least one of the roof side inboard panel 21 and the roof side outboard panel 22 of the roof side rail 11 using fasteners, welding, and/or the like. Referring to FIGS. 5 to 7, the inboard wall 16a of the roof side reinforcement 16 may be fixed to the roof side inboard panel 21 using fasteners, welding, and/or the like, and the outboard wall 16b of the roof side reinforcement 16 may be fixed to the roof side outboard panel 22 using fasteners, welding, and/or the like.

Referring to FIGS. 5 to 7, the roof side inboard panel 21 may include a plurality of inner recessed portions 61 which are recessed from the inboard wall 21a of the roof side inboard panel 21 toward the roof side outboard panel 22. The plurality of inner recessed portions 61 may be spaced apart from each other in a longitudinal direction of the roof side inboard panel 21. Each inner recessed portion 61 may have an inner recessed wall 61a directly contacting the inboard wall 16a of the roof side reinforcement 16, and the inner recessed wall 61a may be flat to match the inboard wall 16a of the roof side reinforcement 16. The inner recessed wall 61a of the roof side inboard panel 21 may be fixed to the inboard wall 16a of the roof side reinforcement 16 using fasteners, welding, and/or the like. Referring to FIG. 5, the inner recessed wall 61a of the roof side inboard panel 21 may be fixed to the inboard wall 16a of the roof side reinforcement 16 through a bolt 24a and a nut 24b. The nut 24b may be received in the cavity 16f of the roof side reinforcement 16, and the nut 24b may be fixed to the inboard wall 16a of the roof side reinforcement 16 by welding. The bolt 24a may be screwed into the nut 24b.

Referring to FIGS. 5 to 7, the roof side outboard panel 22 may include a plurality of outer recessed portions 62 which are recessed from the outboard wall 22a of the roof side outboard panel 22 toward the roof side inboard panel 21. The plurality of outer recessed portions 62 may be spaced apart from each other in a longitudinal direction of the roof side outboard panel 22. Each outer recessed portion 62 may have an outer recessed wall 62a directly contacting the outboard wall 16b of the roof side reinforcement 16, and the outer recessed wall 62a may be flat to match the outboard wall 16b of the roof side reinforcement 16. The outer recessed wall 62a of the roof side outboard panel 22 may be fixed to the outboard wall 16b of the roof side reinforcement 16 using fasteners, welding, and/or the like. Referring to FIG. 6, the outer recessed wall 62a of the roof side outboard panel 22 may be fixed to the outboard wall 16b of the roof side reinforcement 16 by laser welding 25.

Referring to FIG. 7, the plurality of inner recessed portions 61 and the plurality of outer recessed portions 62 may alternate with each other in a longitudinal direction of the roof side rail 11. Specifically, each inner recessed portion 61 may be aligned with the outboard wall 22a between two adjacent outer recessed portions 62 of the roof side outboard panel 22, and each outer recessed portion 62 may be aligned with the inboard wall 21a between two adjacent inner recessed portions 61 of the roof side inboard panel 21.

The inboard wall 16a and the outboard wall 16b of the roof side reinforcement 16 may be fixed to the inner recessed portions 61 of the roof side inboard panel 21 and the outer recessed portions 62 of the roof side outboard panel 22 so that the roof side reinforcement 16 may be firmly fixed to the roof side rail 11.

Figure 8:
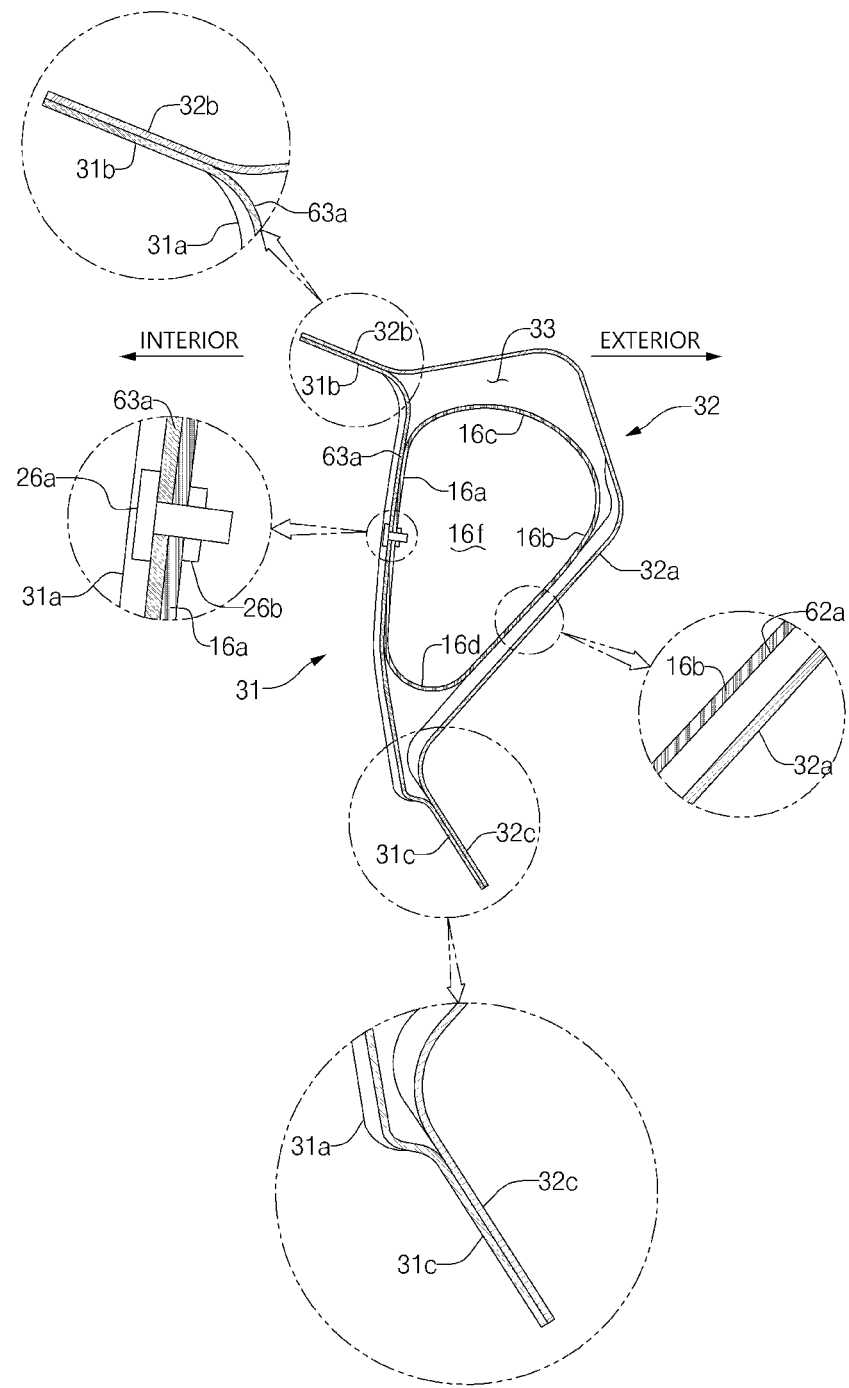
FIG. 8 illustrates a cross-sectional view, taken along line D-D of FIG. 4.
Figure 9:
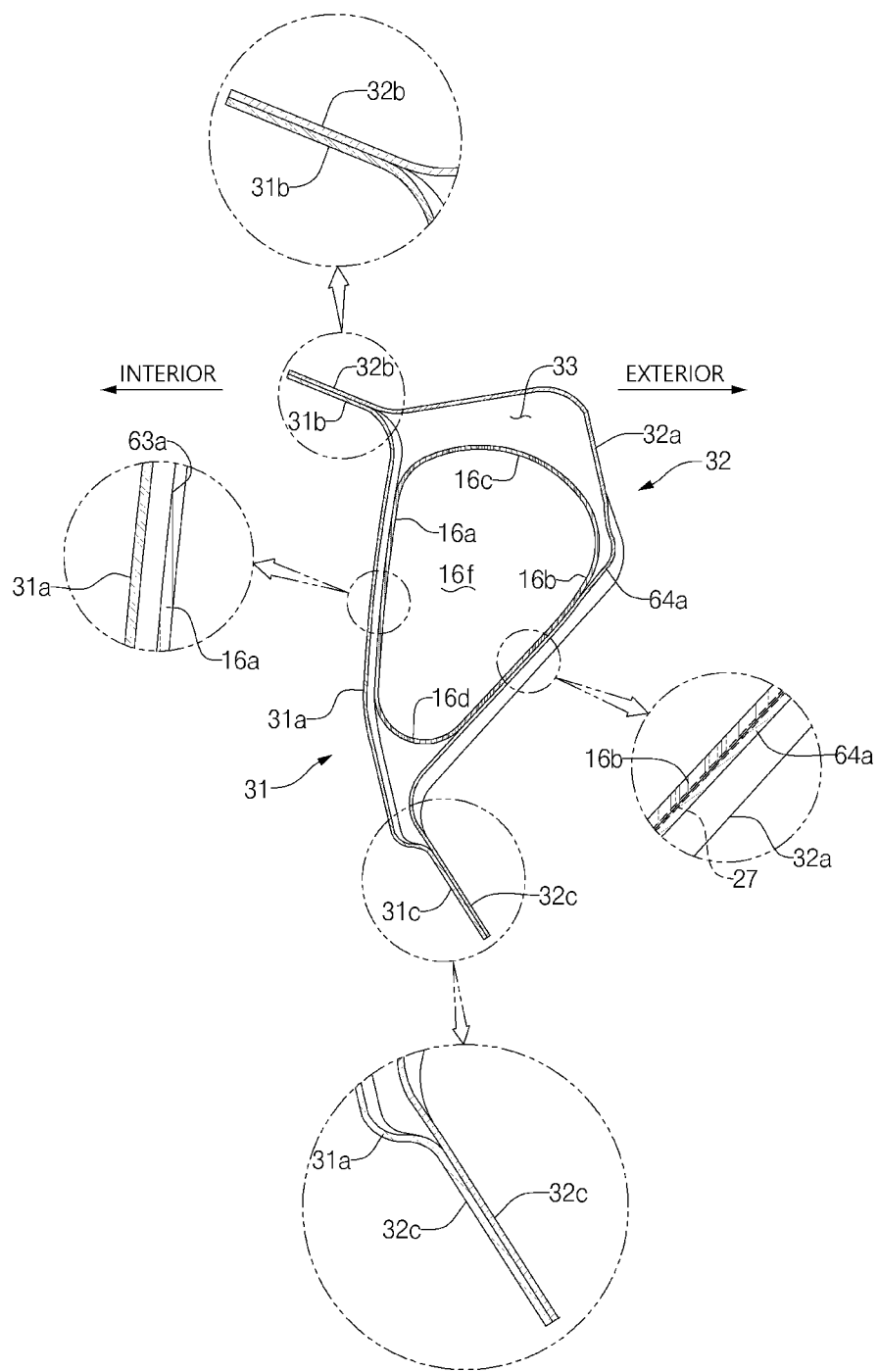
FIG. 9 illustrates a cross-sectional view, taken along line E-E of FIG. 4.

Referring to FIG. 3, the front pillar upper 12a may include a front pillar inboard panel 31 facing the interior of the vehicle and a front pillar outboard panel 32 facing the exterior of the vehicle. Referring to FIGS. 8 and 9, the front pillar inboard panel 31 may include an inboard wall 31a facing the interior of the vehicle, a top flange 31b provided on a top end of the inboard wall 31a, and a bottom flange 31c provided on a bottom end of the inboard wall 31a. The front pillar outboard panel 32 may include an outboard wall 32a facing the exterior of the vehicle, a top flange 32b provided on a top end of the outboard wall 32a, and a bottom flange 32c provided on a bottom end of the outboard wall 32a. The top flange 31b of the front pillar inboard panel 31 may be fixed to the top flange 32b of the front pillar outboard panel 32 using fasteners, welding, and/or the like. The bottom flange 31c of the front pillar inboard panel 31 may be fixed to the bottom flange 32c of the front pillar outboard panel 32 using fasteners, welding, and/or the like. The front pillar upper 12a may have a cavity 33 defined by the front pillar inboard panel 31 and the front pillar outboard panel 32, and the roof side reinforcement 16 may be received in the cavity 33 of the front pillar upper 12a.

Figure 10:
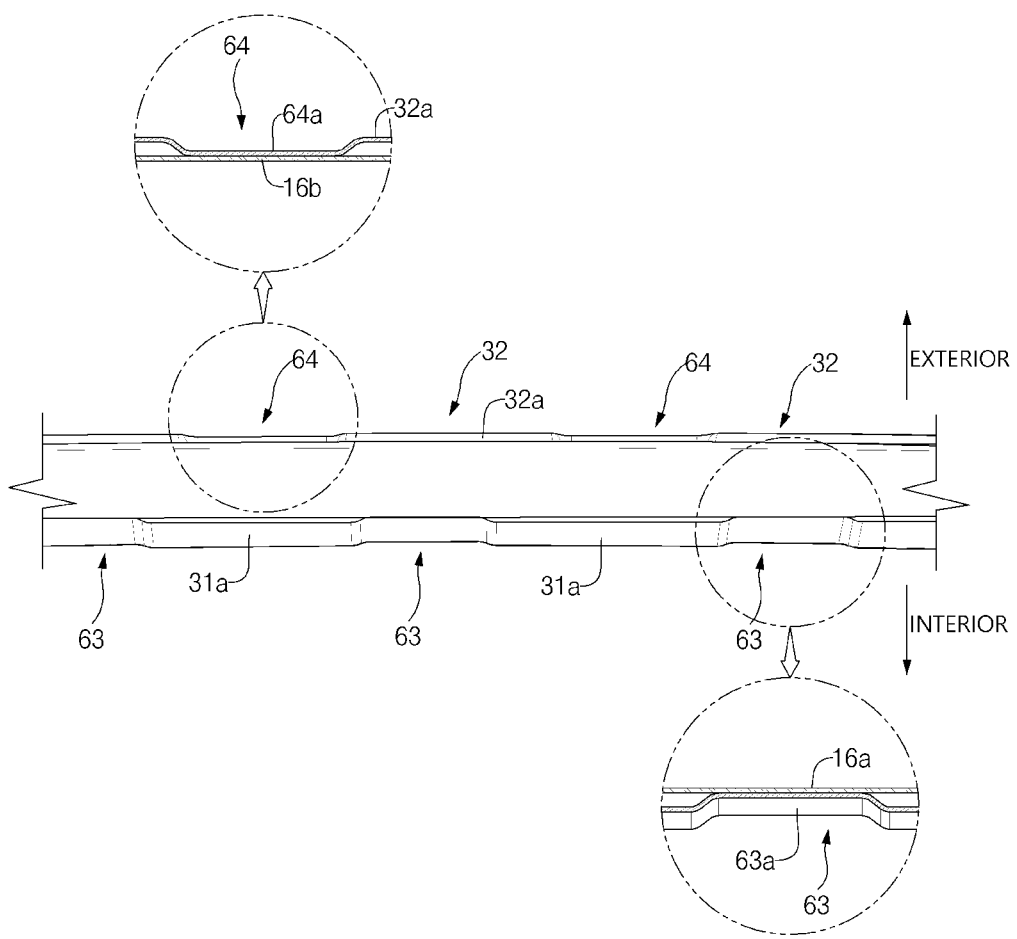
FIG. 10 illustrates a cross-sectional view, taken along line F-F of FIG. 4.

The roof side reinforcement 16 may be fixed to at least one of the front pillar inboard panel 31 and the front pillar outboard panel 32 of the front pillar upper 12a using fasteners, welding, and/or the like. Referring to FIGS. 8 to 10, the inboard wall 16a of the roof side reinforcement 16 may be fixed to the front pillar inboard panel 31 using fasteners, welding, and/or the like, and the outboard wall 16b of the roof side reinforcement 16 may be fixed to the front pillar outboard panel 32 using fasteners, welding, and/or the like.

Referring to FIGS. 8 to 10, the front pillar inboard panel 31 may include a plurality of inner recessed portions 63 which are recessed from the inboard wall 31a of the front pillar inboard panel 31 toward the front pillar outboard panel 32. The plurality of inner recessed portions 63 may be spaced apart from each other in a longitudinal direction of the front pillar inboard panel 31. Each inner recessed portion 63 may have an inner recessed wall 63a directly contacting the inboard wall 16a of the roof side reinforcement 16, and the inner recessed wall 63a may be flat to match the inboard wall 16a of the roof side reinforcement 16. The inner recessed wall 63a of the front pillar inboard panel 31 may be fixed to the inboard wall 16a of the roof side reinforcement 16 using fasteners, welding, and/or the like. Referring to FIG. 8, the inner recessed wall 63a of the front pillar inboard panel 31 may be fixed to the inboard wall 16a of the roof side reinforcement 16 through a bolt 26a and a nut 26b. The nut 26b may be received in the cavity 16f of the roof side reinforcement 16, and the nut 26b may be fixed to the inboard wall 16a of the roof side reinforcement 16 by welding. The bolt 26a may be screwed into the nut 26b.

Referring to FIGS. 8 to 10, the front pillar outboard panel 32 may include a plurality of outer recessed portions 64 which are recessed from the outboard wall 32a of the front pillar outboard panel 32 toward the front pillar inboard panel 31. The plurality of outer recessed portions 64 may be spaced apart from each other in a longitudinal direction of the front pillar outboard panel 32. Each outer recessed portion 64 may have an outer recessed wall 64a directly contacting the outboard wall 16b of the roof side reinforcement 16, and the outer recessed wall 64a may be flat to match the outboard wall 16b of the roof side reinforcement 16. The outer recessed wall 64a of the front pillar outboard panel 32 may be fixed to the outboard wall 16b of the roof side reinforcement 16 using fasteners, welding, and/or the like. Referring to FIG. 9, the outer recessed wall 64a of the front pillar outboard panel 32 may be fixed to the outboard wall 16b of the roof side reinforcement 16 by laser welding 27.

Referring to FIG. 10, the plurality of inner recessed portions 63 and the plurality of outer recessed portions 64 may alternate with each other in a longitudinal direction of the front pillar upper 12a. Specifically, each inner recessed portion 63 may be aligned with the outboard wall 32a between two adjacent outer recessed portions 64 of the front pillar outboard panel 32, and each outer recessed portion 64 may be aligned with the inboard wall 31a between two adjacent inner recessed portions 63 of the front pillar inboard panel 31.

The inboard wall 16a and the outboard wall 16b of the roof side reinforcement 16 may be fixed to the inner recessed portions 63 of the front pillar inboard panel 31 and the outer recessed portions 64 of the front pillar outboard panel 32 so that the roof side reinforcement 16 may be firmly fixed to the front pillar upper 12a.

Referring to FIG. 3, the roof side outboard panel 22 may be longer than the roof side inboard panel 21, and the front pillar inboard panel 31 may be longer than the front pillar outboard panel 32. A front portion of the roof side outboard panel 22 may at least partially overlap a rear portion of the front pillar inboard panel 31. Accordingly, a portion of the roof side reinforcement 16 may be fixed to the outer recessed portion 62 of the roof side outboard panel 22 and the inner recessed portion 63 of the front pillar inboard panel 31.

As described above, the roof side reinforcement 16 may be fixedly received in the cavity 23 of the roof side rail 11 and the cavity 33 of the front pillar upper 12a so that the roof side reinforcement 16 may increase connection stiffness between the roof side rail 11 and the front pillar 12 and smoothly transfer a load applied to a roof structure of the vehicle to the front pillar 12, thereby improving roof strength.

Referring to FIGS. 2 and 3, a front portion of the roof side reinforcement 16 may be fixed to an upper portion of the front pillar lower 12b through a bracket 12c, and thus the roof side reinforcement 16 may improve connection stiffness between the front pillar upper 12a and the front pillar lower 12b.

Figure 12:
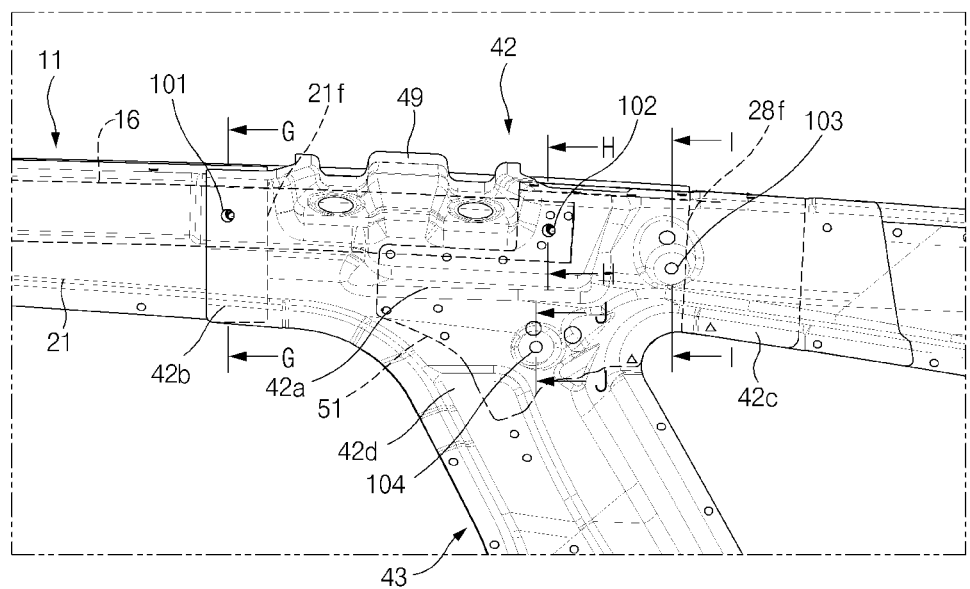
FIG. 12 illustrates an enlarged view of a joint portion between an upper portion of the right rear pillar and a rear portion of the right roof side rail illustrated in FIG. 11.

Referring to FIG. 12, a rear portion of the roof side reinforcement 16 may be fixed to an upper front portion 42 of the rear pillar 13, and thus the roof side reinforcement 16 may improve connection stiffness between the rear portion of the roof side rail 11 and the upper front portion 42 of the rear pillar 13.

Referring to FIG. 2, the rear pillar 13 may include a rear pillar inner 41 facing the interior of the vehicle. The rear pillar inner 41 may include an inboard-side surface facing the interior of the vehicle, and an outboard-side surface facing the exterior of the vehicle. The rear pillar inner 41 may include the upper front portion 42 connected to the rear portion of the roof side rail 11, a front portion 43 facing the front of the vehicle, an upper rear portion 44 extending from the upper front portion 42 toward the rear of the vehicle, and a middle portion 45 disposed between the front portion 43 and the upper rear portion 44. The front portion 43 may extend along a rear edge of the door opening 15. A lower front portion 47 may be provided on the bottom of the front portion 43, and the lower front portion 47 may be connected to the rear portion of the side sill 14. A rear wheel house 50 may be connected to the bottom of the rear pillar 13. The rear pillar inner 41 may include a rear window opening 41a in which a rear window is mounted, and an opening 41b with which a receiving portion 71 of a component mounting bracket 70 is aligned.

Referring to FIG. 1, the rear pillar 13 may include a plurality of reinforcements 51, 52, 53, 54, and 55 mounted on the rear pillar inner 41. A rear pillar outer or a side outer panel may be attached to the rear pillar inner 41 to cover the plurality of reinforcements 51, 52, 53, 54, and 55.

The plurality of reinforcements 51, 52, 53, 54, and 55 may include an upper front reinforcement 51 attached to the upper front portion 42 of the rear pillar inner 41, a front reinforcement 52 attached to the front portion 43 of the rear pillar inner 41, an upper rear reinforcement 53 attached to the upper rear portion 44 of the rear pillar inner 41, a middle reinforcement 54 attached to the middle portion 45 of the rear pillar inner 41, and a lower reinforcement 55 extending from the middle reinforcement 54 to the rear wheel house 50.

Referring to FIGS. 1 and 2, the upper front portion of the rear pillar 13 may at least partially overlap the rear portion of the roof side rail 11, and thus connection stiffness between the rear portion of the roof side rail 11 and the upper front portion of the rear pillar 13 may be improved.

The rear portion of the roof side reinforcement 16 may be fixed to the upper front portion 42 of the rear pillar inner 41 using fasteners, welding, and/or the like. According to a specific exemplary embodiment, the rear portion of the roof side reinforcement 16 may at least partially overlap and be fixed to the rear portion of the roof side rail 11 and the upper front portion 42 of the rear pillar 13, thereby further improving connection stiffness between the rear portion of the roof side rail 11 and the upper front portion of the rear pillar 13.

Figure 11:
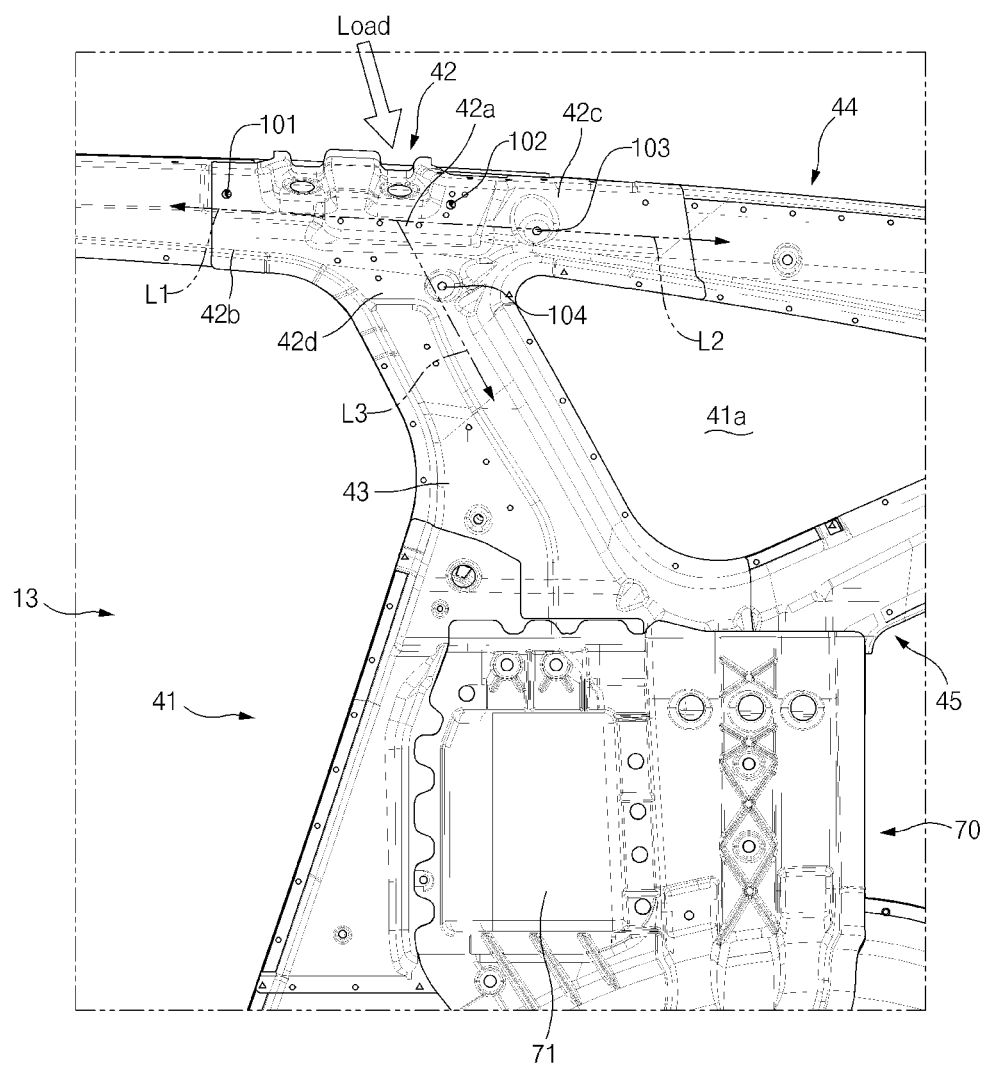
FIG. 11 illustrates a right roof side rail and a right rear pillar in a vehicle body structure according to an exemplary embodiment of the present disclosure, which are viewed from the interior of the vehicle.

Referring to FIGS. 11 and 12, the upper front portion 42 of the rear pillar inner 41 may include a base 42a, a front connection 42b extending from the base 42a toward the roof side rail 11, a rear connection 42c extending from the base 42a toward the rear of the vehicle, and a lower connection 42d extending from the base 42a toward the bottom of the vehicle. The front connection 42b may be directly connected to the roof side rail 11, thereby defining a first load path L1 toward the front of the vehicle. The rear connection 42c may be integrally connected to the upper rear portion 44, thereby defining a second load path L2 toward the rear of the vehicle. The lower connection 42d may be integrally connected to the front portion 43, thereby defining a third load path L3 toward the bottom of the vehicle. As the upper front portion 42 has the front connection 42b extending from the base 42a toward the roof side rail 11, the rear connection 42c extending from the base 42a toward the rear of the vehicle, and the lower connection 42d extending from the base 42a toward the bottom of the vehicle, the upper front portion 42 may define the load paths in three different directions. In the event of a vehicle rollover accident, as an impact load is applied to the upper front portion 42, the impact load may be distributed and transferred through the load paths L1, L2, and L3.

Referring to FIGS. 3 and 4, the roof side outboard panel 22 may have a rear extension portion 28 extending from a rear end 21f of the roof side inboard panel 21 toward the rear of the vehicle. A rear end 28f of the rear extension portion 28 of the roof side outboard panel 22 may be located behind the rear end 21f of the roof side inboard panel 21. A rear portion of the roof side inboard panel 21 of the roof side rail 11 may at least partially overlap the front connection 42b of the upper front portion 42, and the rear extension portion 28 of the roof side outboard panel 22 of the roof side rail 11 may at least partially overlap the front connection 42b, the base 42a, and the rear connection 42c of the upper front portion 42.

Referring to FIG. 12, the upper front portion 42 of the rear pillar inner 41 may at least partially overlap and be fixed to the rear portion of the roof side rail 11. Specifically, the front connection 42b of the upper front portion 42 may at least partially overlap and be fixed to the rear portion of the roof side inboard panel 21 and the rear portion of the roof side reinforcement 16.

Referring to FIG. 12, the upper front portion 42 may include a first fastening point 101 configured to fasten the rear portion of the roof side rail 11 and the rear portion of the roof side reinforcement 16 through a fastener. The first fastening point 101 may be located in an overlapped portion of the front connection 42b of the upper front portion 42, the rear portion of the roof side inboard panel 21, and the rear portion of the roof side reinforcement 16.

Figure 13:
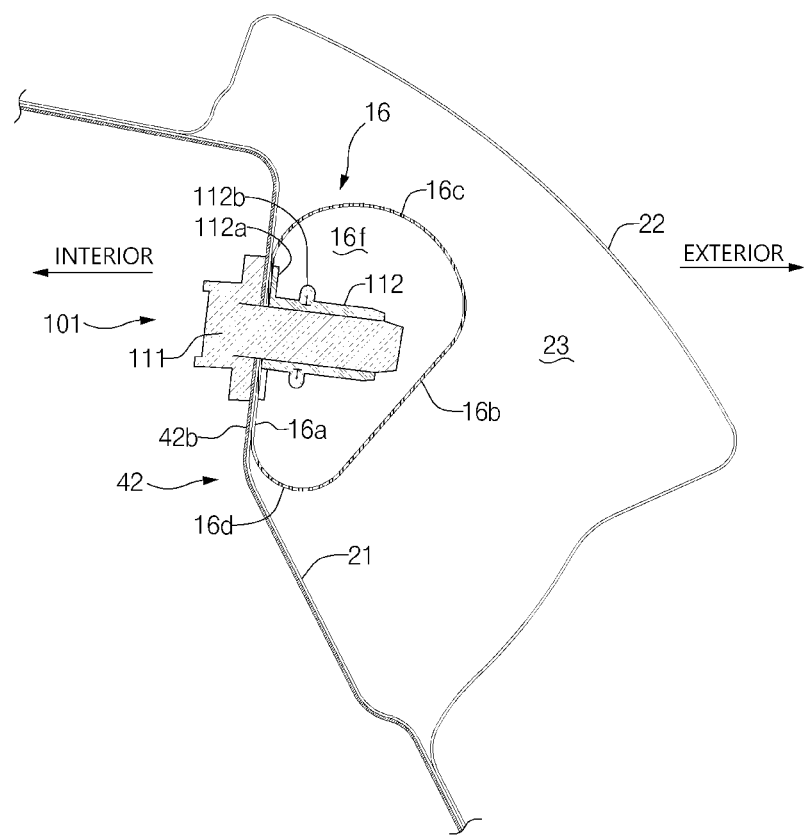
FIG. 13 illustrates a cross-sectional view, taken along line G-G of FIG. 12.

Referring to FIG. 13, on the first fastening point 101, the front connection 42b of the upper front portion 42 may be fixed to the rear portion of the roof side inboard panel 21 and the inboard wall 16a of the roof side reinforcement 16 through a bolt 11 and a nut 112. The nut 112 may be a blind nut having a head 112a and a bulged portion 112b spaced apart from the head 112a. The nut 112 may be received in the cavity 16f of the roof side reinforcement 16, and the head 112a of the nut 112 may be fixed to the inboard wall 16a of the roof side reinforcement 16 by welding. External threads of the bolt in may be screwed into internal threads of the nut 112. By having the head 112a of a relatively large diameter fixedly welded to the inboard wall 16a of the roof side reinforcement 16, and including the bulged portion 112b, stiffness of the nut 112 may be improved. Accordingly, the front connection 42b of the upper front portion 42 may be fixed to the rear portion of the roof side inboard panel 21 of the roof side rail 11 and the rear portion of the roof side reinforcement 16 on the first fastening point 101, thereby achieving sufficient connection stiffness between the upper front portion 42 of the rear pillar 13 and the rear portion of the roof side rail 11.

Figure 14:
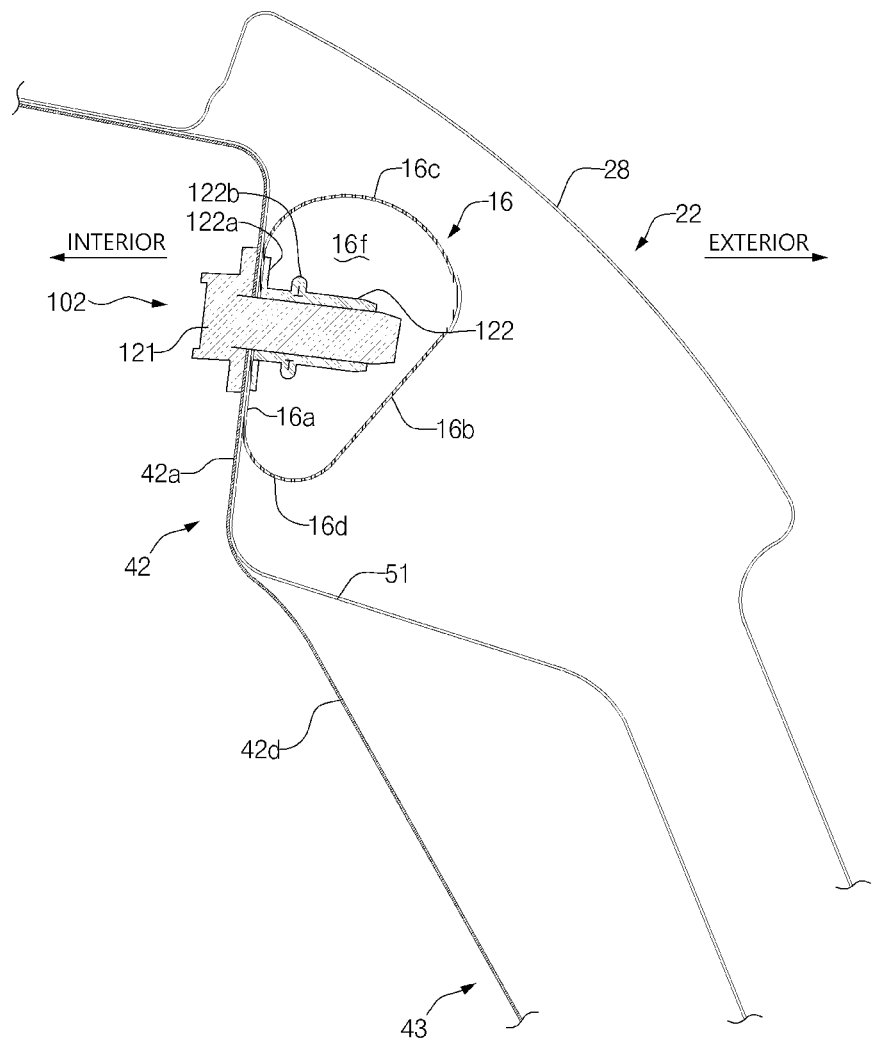
FIG. 14 illustrates a cross-sectional view, taken along line H-H of FIG. 12.

Referring to FIGS. 12 and 14, the upper front portion 42 may include a second fastening point 102 configured to fasten the upper front reinforcement 51 and the rear portion of the roof side reinforcement 16 through a fastener. The second fastening point 102 may be located in an overlapped portion of the base 42a of the upper front portion 42, the upper front reinforcement 51, and the rear portion of the roof side reinforcement 16. The second fastening point 102 may be located behind the first fastening point 101. The upper front reinforcement 51 may be located between the upper front portion 42 and the rear extension portion 28 of the roof side outboard panel 22.

Referring to FIG. 14, on the second fastening point 102, the base 42a of the upper front portion 42 may be fixed to the upper front reinforcement 51 and the inboard wall 16a of the roof side reinforcement 16 through a bolt 121 and a nut 122. The nut 122 may be a blind nut having a head 122a and a bulged portion 122b spaced apart from the head 122a. The nut 122 may be received in the cavity 16f of the roof side reinforcement 16, and the head 122a of the nut 122 may be fixed to the inboard wall 16a of the roof side reinforcement 16 by welding. External threads of the bolt 121 may be screwed into internal threads of the nut 122. By having the head 122a of a relatively large diameter fixedly welded to the inboard wall 16a of the roof side reinforcement 16, and including the bulged portion 122b, stiffness of the nut 122 may be improved. Accordingly, the base 42a of the upper front portion 42 may be fixed to the upper front reinforcement 51 and the rear portion of the roof side reinforcement 16 on the second fastening point 102, thereby achieving sufficient connection stiffness between the upper front portion 42 of the rear pillar 13 and the rear portion of the roof side rail 11.

Figure 15:
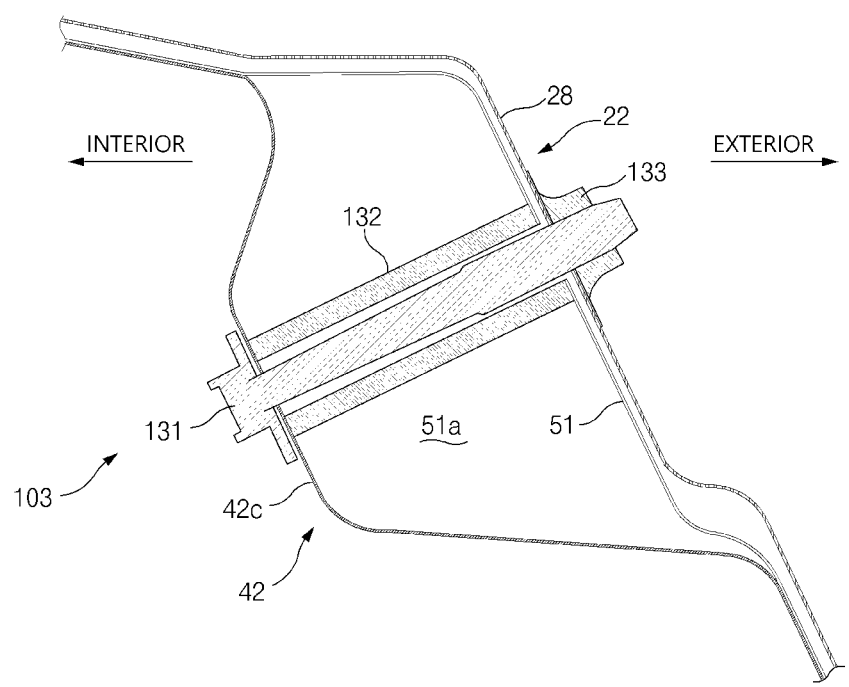
FIG. 15 illustrates a cross-sectional view, taken along line I-I of FIG. 12.

Referring to FIGS. 12 and 15, the upper front portion 42 may include a third fastening point 103 configured to fasten the rear extension portion 28 of the roof side outboard panel 22 and the upper front reinforcement 51 through a fastener. The third fastening point 103 may be located in an overlapped portion of the rear connection 42c of the upper front portion 42, the upper front reinforcement 51, and the rear extension portion 28 of the roof side outboard panel 22. The third fastening point 103 may be located behind the second fastening point 102.

Referring to FIG. 15, the upper front reinforcement 51 and the rear connection 42c of the upper front portion 42 may define a cavity 51a. On the third fastening point 103, the rear connection 42c of the upper front portion 42 may be fixed to the upper front reinforcement 51 and the rear extension portion 28 of the roof side outboard panel 22 through a bolt 131, a pipe nut 132, and a nut 133. The pipe nut 132 may be received in the cavity 51a, and the pipe nut 132 may support the rear connection 42c of the upper front portion 42 and the upper front reinforcement 51. The nut 133 may be fixed to the rear extension portion 28 of the roof side outboard panel 22 by welding, and the nut 133 may be aligned with the pipe nut 132. The bolt 131 may be screwed into the pipe nut 132 and the nut 133. Accordingly, the rear connection 42c of the upper front portion 42 may be fixed to the upper front reinforcement 51 and the rear extension portion 28 of the roof side outboard panel 22 on the third fastening point 103, thereby achieving sufficient connection stiffness between the upper front portion 42 of the rear pillar 13 and the rear portion of the roof side rail 11.

Figure 16:
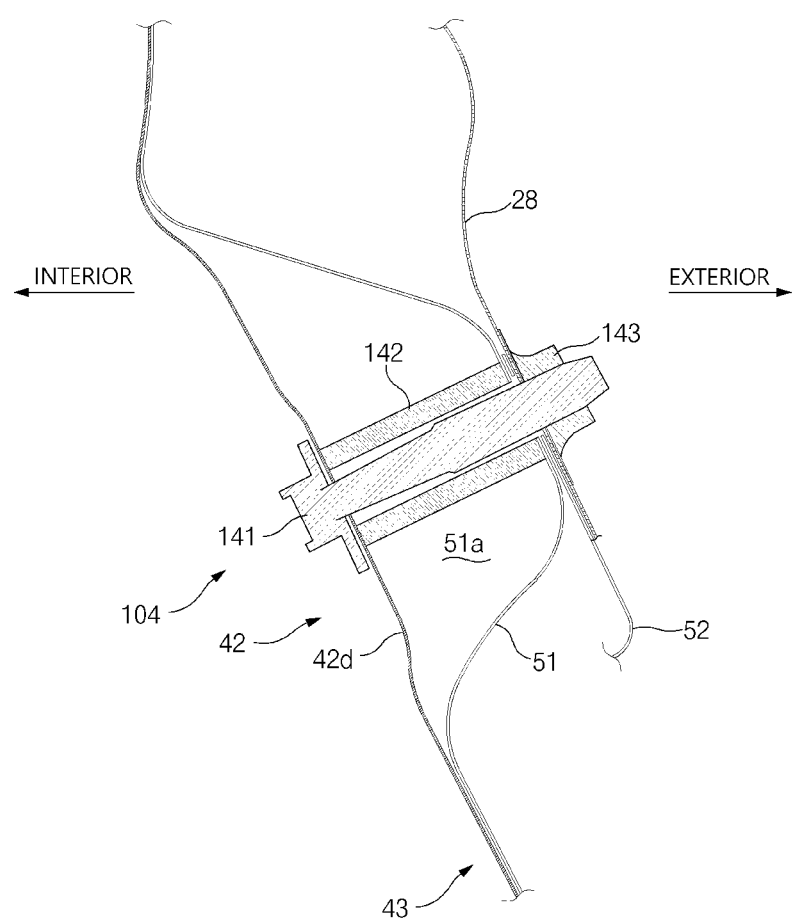
FIG. 16 illustrates a cross-sectional view, taken along line J-J of FIG. 12.

Referring to FIGS. 12 and 16, the upper front portion 42 may include a fourth fastening point 104 configured to fasten the rear extension portion 28 of the roof side outboard panel 22, the upper front reinforcement 51, and the front reinforcement 52 through a fastener. The fourth fastening point 104 may be located in an overlapped portion of the lower connection 42d of the upper front portion 42, the upper front reinforcement 51, the front reinforcement 52, and the rear extension portion 28 of the roof side outboard panel 22. The fourth fastening point 104 may be located below the first fastening point 101, the second fastening point 102, and the third fastening point 103.

Referring to FIG. 16, the upper front reinforcement 51 and the lower connection 42d of the upper front portion 42 may define the cavity 51a, and an upper portion of the front reinforcement 52 may overlap the upper front reinforcement 51. On the fourth fastening point 104, the lower connection 42d of the upper front portion 42 may be fixed to the upper front reinforcement 51, the front reinforcement 52, and the rear extension portion 28 of the roof side outboard panel 22 through a bolt 141, a pipe nut 142, and a nut 143. The pipe nut 142 may be received in the cavity 51a, and the pipe nut 142 may support the lower connection 42d of the upper front portion 42 and the upper front reinforcement 51. The nut 143 may be fixed to the rear extension portion 28 of the roof side outboard panel 22 by welding, and the nut 143 may be aligned with the pipe nut 142. The bolt 141 may be screwed into the pipe nut 142 and the nut 143. Accordingly, the lower connection 42d of the upper front portion 42 may be fixed to the upper front reinforcement 51, the front reinforcement 52, and the rear extension portion 28 of the roof side outboard panel 22 on the fourth fastening point 104, thereby achieving sufficient connection stiffness between the upper front portion 42 of the rear pillar 13 and the rear portion of the roof side rail 11.

As described above, the upper front portion 42 of the rear pillar 13 may be fixed to the roof side rail 11, the roof side reinforcement 16, and the reinforcements 51 and 52 through the first fastening point 101, the second fastening point 102, the third fastening point 103, and the fourth fastening point 104 so that a closed cross section of the rear pillar 13 may be continuously connected to a closed cross section of the roof side rail 11, thereby preventing the upper front portion 42 of the rear pillar 13 and the rear portion of the roof side rail 11 from being damaged by the impact load.

As described above, the upper front portion 42 of the rear pillar 13 may be firmly fixed to the rear portion of the roof side rail 11 and the rear portion of the roof side reinforcement 16 through the first fastening point 101, the second fastening point 102, the third fastening point 103, and the fourth fastening point 104, thereby achieving sufficient connection stiffness between the rear portion of the roof side rail 11 and the upper front portion 42 of the rear pillar 13. Thus, stiffness of the vehicle body may be improved, and noise, vibration, and harshness (NVH) may be reduced. In particular, the upper front portion 42 of the rear pillar 13 may be configured to extend in three different directions so that a load applied to the upper front portion 42 of the rear pillar 13 may be distributed and transferred in three different directions through the front connection 42b, the rear connection 42c, and the lower connection 42d. By minimizing deformation of the vehicle body during a vehicle collision/impact, occupants may be protected more safely.

As set forth above, the vehicle body structure according to exemplary embodiments of the present disclosure may improve the roof strength by distributing and transferring a load applied to the roof to the front pillar and the rear pillar of the vehicle body through the roof side reinforcement extending from the roof side rail to the front pillar and the rear pillar.

The vehicle body structure according to exemplary embodiments of the present disclosure may improve the overall stiffness and durability of the vehicle body by increasing the connection stiffness between the roof side rail and the rear pillar. In particular, by preventing the occurrence of stress concentration on a joint portion between the roof side rail and the rear pillar, the deformation of the vehicle body may be minimized in the event of a vehicle rollover accident.

In particular, the vehicle body structure according to exemplary embodiments of the present disclosure may be applied to a center pillarless vehicle from which a center pillar is removed. Since the load can be properly distributed and transferred to the roof side rail, the front pillar, and the rear pillar, the roof strength and crashworthiness may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body comprising:
a roof side rail;
a front pillar connected to a front portion of the roof side rail; and
a roof side reinforcement extending along the roof side rail and the front pillar, wherein the roof side reinforcement is fixedly arranged in a cavity of the roof side rail and a cavity of the front pillar,
wherein the roof side rail comprises a roof side inboard panel facing an interior of the vehicle body and a roof side outboard panel facing an exterior of the vehicle body,
wherein the front pillar comprises a front pillar upper connected to the front portion of the roof side rail and a front pillar lower connected to the front pillar upper,
wherein the front pillar upper comprises a front pillar inboard panel facing the interior of the vehicle body and a front pillar outboard panel facing the exterior of the vehicle body,
wherein the roof side inboard panel has a plurality of inner recessed portions, which is recessed toward the roof side reinforcement,
wherein the plurality of inner recessed portions is fixed to the roof side reinforcement,
wherein the roof side outboard panel has a plurality of outer recessed portions, which is recessed toward the roof side reinforcement,
wherein the plurality of outer recessed portions is fixed to the roof side reinforcement, and
wherein the plurality of inner recessed portions and the plurality of outer recessed portions alternate with each other in a longitudinal direction of the roof side rail.

2. The vehicle body according to claim 1,
wherein the front pillar inboard panel has an inner recessed portion, which is recessed toward the roof side reinforcement, and
wherein the inner recessed portion is fixed to the roof side reinforcement.

3. The vehicle body according to claim 1,
wherein the front pillar outboard panel has an outer recessed portion, which is recessed toward the roof side reinforcement, and
wherein the outer recessed portion is fixed to the roof side reinforcement.

4. A vehicle body comprising:
a roof side rail;
a rear pillar having an upper front portion connected to a rear portion of the roof side rail, wherein the rear portion of the roof side rail at least partially overlaps and is fixed to the upper front portion of the rear pillar; and
a roof side reinforcement extending along the roof side rail and the upper front portion of the rear pillar;
wherein the roof side rail comprises a roof side inboard panel facing an interior of the vehicle body and a roof side outboard panel facing an exterior of the vehicle body; and
wherein the roof side inboard panel has a plurality of inner recessed portions, which is recessed toward the roof side reinforcement,
wherein the plurality of inner recessed portions is fixed to the roof side reinforcement,
wherein the roof side outboard panel has a plurality of outer recessed portions, which is recessed toward the roof side reinforcement,
wherein the plurality of outer recessed portions is fixed to the roof side reinforcement, and
wherein the plurality of inner recessed portions and the plurality of outer recessed portions alternate with each other in a longitudinal direction of the roof side rail.

5. The vehicle body according to claim 4, wherein a rear portion of the roof side reinforcement at least partially overlaps and is fixed to the rear portion of the roof side rail or the upper front portion of the rear pillar.

6. The vehicle body according to claim 4, wherein a rear portion of the roof side reinforcement at least partially overlaps and is fixed to the rear portion of the roof side rail and the upper front portion of the rear pillar.

7. The vehicle body according to claim 4, wherein the upper front portion of the rear pillar includes a fastening point at which the roof side rail and a rear portion of the roof side reinforcement are fastened through a fastener.

8. The vehicle body according to claim 7, wherein the fastening point is located in an overlapped portion of the upper front portion of the rear pillar, a rear portion of the roof side inboard panel, and the rear portion of the roof side reinforcement.

9. The vehicle body according to claim 4,
wherein the rear pillar comprises a rear pillar inner facing the interior of the vehicle body and an upper front reinforcement attached to an upper front portion of the rear pillar inner, and
wherein the upper front portion of the rear pillar comprises a fastening point at which a rear portion of the roof side reinforcement and the upper front reinforcement are fastened through a fastener.

10. The vehicle body according to claim 4,
wherein the rear pillar comprises a rear pillar inner facing the interior of the vehicle body and an upper front reinforcement attached to an upper front portion of the rear pillar inner, and
wherein the upper front portion of the rear pillar comprises a fastening point at which the upper front reinforcement and a rear extension portion of the roof side outboard panel are fastened through a fastener.

11. The vehicle body according to claim 4, wherein the rear pillar comprises a rear pillar inner facing the interior of the vehicle body, an upper front reinforcement attached to an upper front portion of the rear pillar inner, and a front reinforcement attached to a front portion of the rear pillar inner.

12. The vehicle body according to claim 11,
wherein an upper portion of the front reinforcement overlaps the upper front reinforcement, and
wherein the upper front portion of the rear pillar comprises a fastening point at which the upper front reinforcement, the front reinforcement, and a rear extension portion of the roof side outboard panel are fastened through a fastener.

13. The vehicle body according to claim 4, wherein the upper front portion of the rear pillar comprises:
a base;
a front connection extending from the base toward the roof side rail;
a rear connection extending from the base toward a rear of the vehicle body; and
a lower connection extending from the base toward a bottom of the vehicle body.

14. A method of providing a vehicle body, the method comprising:
providing a roof side rail comprising a roof side inboard panel facing an interior of the vehicle body and a roof side outboard panel facing an exterior of the vehicle body;
connecting a front pillar to a front portion of the roof side rail; and
providing a roof side reinforcement extending along the roof side rail and the front pillar, wherein the roof side reinforcement is fixedly received arranged in a cavity of the roof side rail and a cavity of the front pillar and is fixed to the roof side inboard panel or the roof side outboard panel;
wherein the front pillar comprises a front pillar upper connected to the front portion of the roof side rail and a front pillar lower connected to the front pillar upper;
wherein the front pillar upper comprises a front pillar inboard panel facing the interior of the vehicle body and a front pillar outboard panel facing the exterior of the vehicle body; and
wherein the front pillar inboard panel has a plurality of inner recessed portions, which is recessed toward the roof side reinforcement,
wherein the plurality of inner recessed portions is fixed to the roof side reinforcement,
wherein the front pillar outboard panel has a plurality of outer recessed portions, which is recessed toward the roof side reinforcement,
wherein the plurality of outer recessed portions is fixed to the roof side reinforcement, and
wherein the plurality of inner recessed portions and the plurality of outer recessed portions alternate with each other in a longitudinal direction of the front pillar upper.

* * * * *